D. R. PRATT.
Sawing-Machines.

No. 146,021.  Patented Dec. 30, 1873.

Witnesses.  Inventor.

UNITED STATES PATENT OFFICE.

DAVID R. PRATT, OF GREENFIELD, OHIO.

IMPROVEMENT IN SAWING-MACHINES.

Specification forming part of Letters Patent No. 146,021, dated December 30, 1873; application filed June 17, 1873.

*To all whom it may concern:*

Be it known that I, DAVID R. PRATT, of Greenfield, county of Highland and State of Ohio, have invented certain new and useful Improvements in Sawing-Machines, of which the following is a specification:

The nature of my invention relates to an improvement in sawing-machines; and it consists in the arrangement of devices, which will be more fully described hereafter, whereby a single man is enabled to operate a heavy crosscut-saw by himself for all kinds of work.

Figure 1:
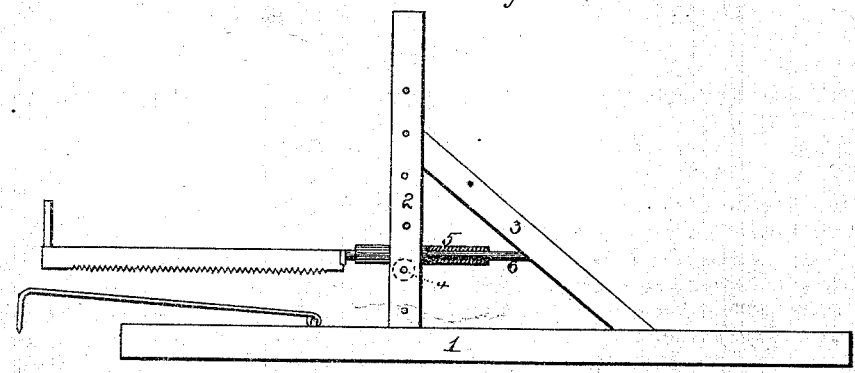
Figure 2:
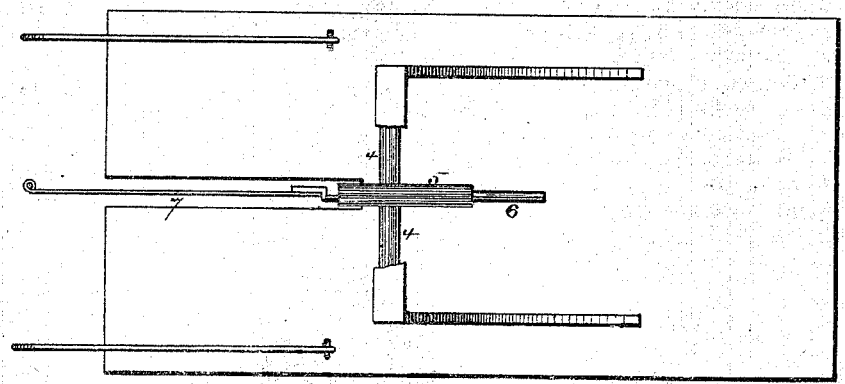

Figure 1 is a side elevation of my invention. Fig. 2 is a plan view of the same.

1 represents a suitable base, to which the standards 2 are secured, braced by the props 3. Extending across between these standards is the pivot rod or bar 4, having the socket or sleeve 5 secured to it at right angles, for receiving the end or handle 6 of the saw. Each standard has a number of holes through it, so that the pivot can be raised and lowered at will to suit all kinds of work. Through the front end of the base is a slot, 7, so that the saw can be made to cut down to the ground, or as low as may be necessary.

In sawing logs the frame is placed on the ground beside them, and made firm and fast by driving the two dogs into them, when a single man can operate the heavy crosscut-saw as well as two men could do.

Having thus described my invention, what I claim as new, and desire to secure by Letters Patent, is—

The combination of the saw, sleeve, pivot-bar, and standards, substantially as shown and described.

In testimony that I claim the foregoing as my invention I hereunto affix my signature this 4th day of June, 1873.

DAVID R. PRATT.

Witnesses:
W. H. IRWIN,
HARRY NEWKIRK.